United States Patent [19]
Toth et al.

[11] Patent Number: 5,082,294
[45] Date of Patent: Jan. 21, 1992

[54] HEAT CONDUCTING WEAR SLEEVE ASSEMBLY FOR LUBRICANT SEALS

[75] Inventors: David M. Toth, Brighton; William H. Riggs, Saline, both of Mich.

[73] Assignee: Federal-Mogul Corporation, Southfield, Mich.

[21] Appl. No.: 585,321

[22] Filed: Sep. 20, 1990

[51] Int. Cl.⁵ .............................................. F16J 15/32
[52] U.S. Cl. ..................................... 277/37; 277/153; 277/181
[58] Field of Search ................. 277/37, 153, 181, 189, 277/152, 160, 207 R, 213; 285/223, 235

[56] References Cited

U.S. PATENT DOCUMENTS

| | | |
|---|---|---|
| 1,849,359 | 3/1952 | Braden . |
| 1,944,385 | 1/1934 | Wheeler . |
| 2,153,499 | 4/1939 | Chievitz . |
| 2,833,570 | 5/1958 | Porte et al. . |
| 2,840,350 | 6/1958 | Pierce . |
| 3,207,521 | 9/1965 | Dega . |
| 3,214,180 | 10/1965 | Hudson et al. . |
| 3,383,117 | 5/1968 | Fagel . |
| 3,408,084 | 10/1968 | Huling ............................ 277/37 |
| 3,545,770 | 12/1970 | Wheelock . |
| 3,682,488 | 8/1972 | Matsushima ...................... 277/37 |
| 3,918,724 | 11/1975 | Alley . |
| 4,436,317 | 3/1984 | Schmitt ............................ 277/153 |
| 4,861,172 | 8/1989 | Annast et al. . |

FOREIGN PATENT DOCUMENTS

| | | | |
|---|---|---|---|
| 3202381 | 8/1983 | Fed. Rep. of Germany | 277/153 |
| 3315908 | 8/1984 | Fed. Rep. of Germany | 277/153 |
| 0859860 | 1/1961 | United Kingdom | 277/37 |

OTHER PUBLICATIONS

SAE Technical Paper Series No. 880306-Scene-of-the-Crime, Feb. 1988, Running Surfaces in the Sealing Interface of Shaft Seal to Shaft.

Primary Examiner—William A. Cuchlinski, Jr.
Assistant Examiner—Daniel G. DePumpo
Attorney, Agent, or Firm—Lawrence J. Shurupoff

[57] ABSTRACT

An annular wear sleeve assembly is installable on a circular metal shaft, or in a circular opening of a surrounding housing, to provide a smooth wear-resistant surface engageable with an annular elastomeric sealing element carried on the housing or the shaft. The wear sleeve includes a radially deformable liner that maintains biased contact with the shaft or housing surface regardless of tolerance variations in the housing or shaft diameter. The liner is constructed to provide a low force installation and to act as a thermal conduction device between the inner surface of the sleeve and the shaft or housing.

4 Claims, 2 Drawing Sheets

HEAT CONDUCTING WEAR SLEEVE ASSEMBLY FOR LUBRICANT SEALS

BACKGROUND OF THE INVENTION

1. Field of the Invention

This invention relates to an annular wear sleeve assembly installable with a low insertion force into an annular clearance space between a circular metal shaft and a surrounding annular housing to provide a smooth contact surface for an annular elastomeric seal element. The wear sleeve assembly is designed to efficiently conduct frictional heat generated between the seal element and the wear sleeve into the shaft or the housing depending on whether the wear sleeve assembly is installed on the shaft or on the housing.

2. Description of Prior Developments

Wear sleeves have been used to provide a smooth, hard contact surface for engaging an elastomeric seal lip so as to protect the seal lip from rough shaft surfaces. Some wear sleeves have been designed to conduct heat from the seal lip to a shaft. However, prior wear sleeves often required high installation forces which caused damage to the seal or resulted in improper or misaligned seal mounting which immediately or eventually resulted in seal leakage.

More particularly, when installing a wear sleeve over a shaft or into a bore, it is desirable to minimize the installation force required to overcome the frictional resistance to axial movement between the sleeve and shaft or bore. Since the wear sleeve must form a fluid tight seal with the bore or shaft, prior wear sleeve designs required the use of elastomeric liners or required a tight metal-to-metal press fit. In the case of elastomeric liners, the elastomers served as a thermal barrier to the conduction of heat from the seal lip to the shaft or bore. This condition resulted in high seal lip temperatures which led to premature seal failures as these excessive running temperatures embrittled and degraded the elastomeric lip materials causing the seal lip to lose its resilience and thus lose contact with the shaft.

In the case of press fit metal liners, very high installation forces were required and resulted in seal damage during installation. Accordingly, a need exists for a wear sleeve which efficiently conducts heat from a seal lip to a shaft or housing bore and which requires a relatively low installation force yet provides a fluid-tight seal.

Wear sleeves for elastomeric sealing elements are shown in U.S. Pat. No. 3,207,521 to R. Dega, U.S. Pat. No. 3,214,180 to Hudson, et al, U.S. Pat. No. 3,383,117 to Fagel and U.S. Pat. No. 4,552,367.

In the arrangement of U.S. Pat. No. 3,207,521 the annular wear unit has a relatively thick annular elastomeric liner molded to conform to the surface of the shaft on which the wear unit is mounted. The elastomeric liner acts as a barrier to the flow of heat from the wear unit into the shaft so that shaft cannot act as an effective heat dissipation device.

The wear sleeve structure of U.S. Pat. No. 3,214,180 includes two axially-spaced annular resilient rings located in grooves formed in the inner surface of the wear unit. These rings are sized to grip the shaft surface for operatively positioning the wear unit on the shaft. The resilient rings act as spacers between the wear unit and shaft surface thereby acting as thermal isolators so that the shaft cannot serve as a heat dissipation device.

The issue of effective heat transfer from a seal lip to a shaft is addressed in U.S. Pat. No. 3,383,117 to Fagel wherein a copper wear sleeve is covered with a layer of chromium applied by a galvanizing process. The issue of installation force is not addressed.

U.S. Pat. No. 4,552,367 shows an annular metallic wear unit that has a relatively short axially-extending section adapted to have a press fit on the surface of a shaft on which the wear unit is mounted. Another longer annular section of the wear unit has a relatively larger internal diameter that provides an annular surface spaced radially away from the shaft surface. This longer annular section of the wear unit is designed for an easy manual slip fit on the shaft, for thus piloting the wear sleeve assembly firmly onto the shaft prior to press fit interference action between the wear unit and shaft surface.

In order for the wear unit of U.S. Pat. No. 4,552,367 to be operatively installed on a shaft, the shaft diameter must be within a relatively close tolerance range relative to the internal diameter of the wear sleeve assembly. If the shaft diameter is too small the wear sleeve assembly will be loose on the shaft. If the shaft diameter is too large it will not be possible to force the wear unit onto the shaft without compromising the structural integrity of the wear unit.

SUMMARY OF THE INVENTION

The wear unit of the present invention has been designed to fulfill the needs noted above. In one form of the invention a wear-resistant sleeve having a smooth cylindrical outer surface is adapted to slidably ride on the confronting surface of a cooperating elastomeric seal element. A liner extends within the sleeve in the space between the sleeve and shaft. This liner is formed of an easily deformable or deflectable material so that when the wear sleeve assembly is installed on a circular shaft the liner is easily radially squeezed between the inner surface of the sleeve and the outer surface of the shaft.

The sleeve and liner are formed of thermally conductive materials such that frictional heat generated between the surface of the elastomeric sealing element and the outer surface of the liner is conducted through the sleeve and liner into the shaft. In this manner the shaft acts as a heat sink or heat dissipation device.

The radially deformable liner is adapted to conform to the surface of an associated shaft, even though the shaft diameter varies within a relatively wide tolerance range. Shaft diameter variations of 0.02 inches can be tolerated without adversely affecting the structural integrity of the wear sleeve assembly. Because the sleeve and liner are each formed of thermally conductive materials, the wear sleeve assembly can transmit heat from seal friction into the shaft on which the wear sleeve assembly is mounted.

The invention can be used either with housing-mounted seals or with shaft-mounted seals. In the latter case the wear sleeve will be installed as a slip fit within a circular recess in the housing.

DESCRIPTION OF A PREFERRED EMBODIMENT OF THE INVENTION

Figure 1:
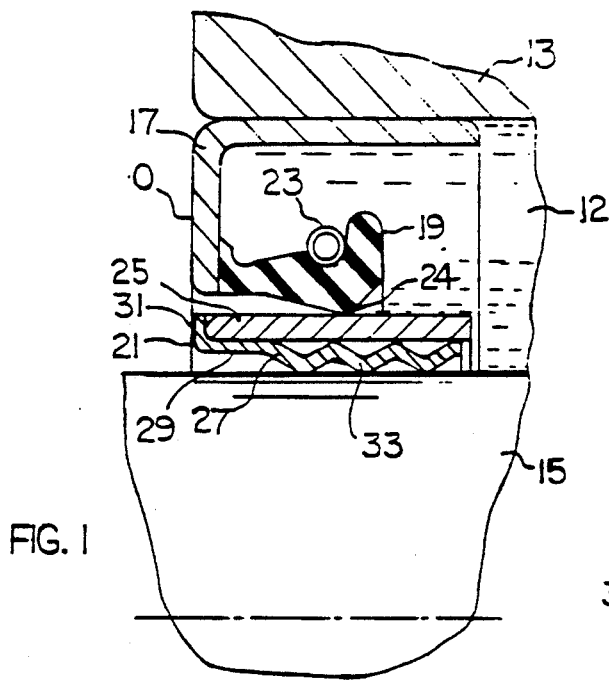
FIG. 1 is a fragmentary sectional view taken through a sealing assembly embodying the invention.

FIG. 1 fragmentarily shows a seal assembly 10 for preventing liquid flow through an annular space 12 between a housing 13 and a circular shaft 15. The shaft and housing are relatively rotatable so that the shaft can be rotatable and the housing stationary, or the shaft can be stationary and the housing rotatable.

Seal assembly 10 includes a metallic seal casing 17, an elastomeric seal element 19 having its left end surface bonded to casing 17, and an annular wear sleeve assembly 21 carried on shaft 15. A garter spring 23 encircles the elastomeric element to bias it into sealing engagement with the outer surface of wear sleeve assembly 21. The area to the right of seal casing 17 is generally oil-filled. Seal assembly 10 is designed to prevent escape of oil, lubricant, or other fluids across the rotary sliding interface 24 between wear sleeve assembly 21 and an elastomeric element 19.

The present invention is concerned with the construction of the wear sleeve assembly 21 which includes an outer annular steel or metallic heat conducting sleeve 25 and an inner liner 27 formed of a thermally conductive sheet material, e.g. steel, aluminum, brass, bronze, copper, nickel or similar materials. The liner has a cylindrical section 29 having a press fit within sleeve 25, such that the sleeve and liner are permanently joined together for handling as a single unit. A radial flange 31 is formed on the liner to limit the insertional motion of the liner into the sleeve during the operation of press fitting the liner into the sleeve.

Figure 2:
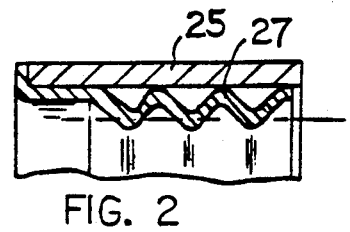
FIG. 2 is a fragmentary sectional view taken through a wear unit forming part of the FIG. 1 sealing assembly, with the wear unit in an unstressed state prior to installation on a circular shaft.

Liner 27 has a second axially extending section 33 having localized areas thereof deformed radially inwardly for pressure contact with the surface of shaft 15. As shown in FIGS. 1 and 2, the deformed areas of the liner are configured as annular circumferential corrugations. Apex areas of the corrugations engage the inner surface of sleeve 25 and the surface of shaft 15 to form sealed connections preventing oil leakage through the space occupied by the liner. Void spaces are defined between the liner and the wear sleeve and between the liner and the shaft.

FIG. 2 shows the corrugated liner prior to installation of the wear unit onto shaft 15. The dashed line in FIG. 2 illustrates a representative shaft surface. Liner 27 may have a wall thickness that is less than the wall thickness of sleeve 25. For example, the sleeve wall thickness can be approximately 0.04 inch, whereas the wall thickness of the liner can be about 0.015 inch. The radial gap between the sleeve and the shaft 15 surface can be up to 0.04 inch or more, although the gap will vary depending on the shaft diameter tolerances. In the as-formed state of the liner, the liner corrugations have radial amplitude dimensions greater than the radial thickness of the gap between sleeve 25 and the shaft surface so as to ensure a press fit therebetween.

Installation of the wear sleeve assembly onto a circular shaft can be accomplished by moving the wear sleeve assembly in a left-to-right direction onto the shaft, assuming the shaft is stationary. During this insertional mounting movement the corrugated section of the liner will be squeezed radially inwardly and partially flattened between the sleeve and the shaft so as to be in a radially stressed and compressed condition. This flattening increases the contact area and improves the heat transfer between the shaft, liner and sleeve.

When the wear sleeve assembly is in its installed position the apex areas of the liner corrugations will have pressure engagement with the sleeve and shaft surfaces. Sleeve 25 may be a relatively thick rigid hard component that retains its original configuration during the wear unit installation process so that during the installation process only the liner undergoes radial deformation.

Depending on the materials used in its construction, the liner can be a relatively soft non-resilient material or a harder resilient material. A resilient material such as copper will have stored spring energy resulting from the wear sleeve assembly installation process. Such stored spring energy will enable the liner to maintain continued pressurized engagement on the shaft surface for satisfactory sealing of the liner-shaft interface during periods of high temperature relative rotation between the shaft and seal as well as during low temperature relative stationary periods.

If the liner is formed of a softer material, such as aluminum, the liner will be deformed so that inner apex areas of the liner corrugations flatten against the shaft surface. Sealing action is achieved due to the liner material being swaged into intimate contact with the relatively hard shaft surface. The liner material will be forced into any pits, scratches or negative depressions in the shaft surface.

One advantage of the illustrated wear sleeve assembly is an ability to adapt itself to relatively wide tolerances in shaft diameter or shaft surface roughness. The liner corrugations can experience a relatively great or a relatively small radial deformation during the wear sleeve assembly installation process without adversely affecting the structural integrity of steel sleeve 25. Because the liner material is relatively thin, it is easily radially compressed during installation so that installation forces are relatively low thereby facilitating installation of the wear sleeve assembly over a shaft or into a housing. In the event the liner is fabricated from a relatively soft material, installation forces are even further reduced.

Another advantage of the illustrated wear sleeve assembly is the ability to conduct heat from the sealing interface 24 through the wear sleeve assembly into shaft 15. The contact zones between the liner corrugations and the shaft surface are of sufficient area to effectively transmit frictional heat generated at interface 24 into the shaft 15 thereby preventing thermal degradation of elastomeric element 19.

Figure 3:
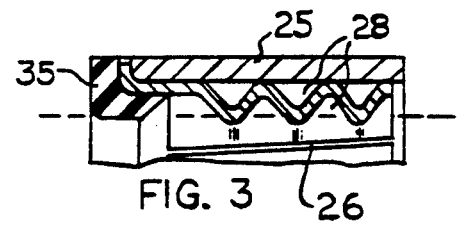
FIGS. 3 through 9 are fragmentary sectional views taken in the same direction as FIG. 2, but illustrating other wear units constructed according to the invention.

FIG. 3 illustrates another form that the wear unit can take. In this case the liner is formed with a narrow axial slit 26 extending from its left end edge to its right end edge. The axial slit gives the liner a somewhat C-shaped configuration in the transverse cross section dimension normal to the plane of the paper in FIG. 3. A principal reason for the slit is to reduce the hoop strength of the liner, thereby enabling the liner to more easily fit onto the associated shaft or into an associated bore. The liner has the same axial cross sectional configuration as the FIG. 2 liner, but it does not form a seal against the shaft surface because the axial slit 26 provides a potential leakage path for the oil.

Leakage of oil in a right-to-left direction is prevented by the addition of an annular elastomeric sealing element 35 bonded to the left end edge of the sleeve-liner assembly. The inner diameter of element 35 is less than the expected diameter of the associated circular shaft so that when the wear sleeve assembly is installed on the shaft, element 35 will have pressurized sealed contact with the shaft surface. A section of element 35 extends rightwardly within the space circumscribed by the liner to increase the interface contact area between the elastomeric element and the sleeve-liner assembly. This increases the integrity of the bond connection between the elastomeric element and the sleeve-liner assembly.

Operationally, the FIG. 3 wear sleeve assembly utilizes elastomeric element 35 as the sealing device to prevent oil leakage. The corrugated liner is used as a heat transmitting member between steel or metallic sleeve 25 and the shaft surface. Oil seeps into the corrugation spaces 28 through the axial slit to augment the heat transferring action of the liner, i.e. oil in the corrugation spaces transmits heat directly by conduction from sleeve 25 to the shaft surface rather than through air convection as in FIG. 1.

Figure 4:
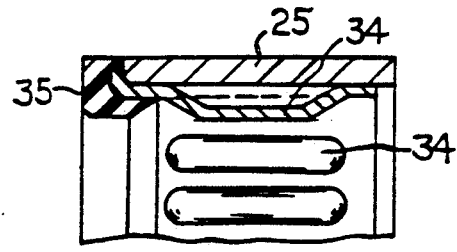

FIG. 4 illustrates a wear sleeve assembly wherein a continuous annular metallic liner has deformed areas configured as axially-extending radial protrusions or ribs 34. The spaces between the protrusions constitute potential oil leakage paths. Therefore the wear sleeve-liner assembly has an elastomeric seal element 35 bonded to its left end edge. Element 35 performs the sealing function, whereas the metallic liner performs the heat-transmitting function.

Figure 5:
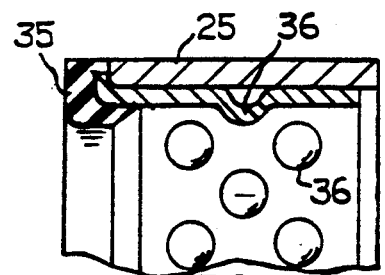

FIG. 5 illustrates a wear sleeve assembly wherein the deformed areas of the metallic liner are configured as arcuate or hemispheric projections 36. These projections are deformed and flattened by contact with the shaft surface to provide a pressurized or deformed heat-transmitting connection between the wear unit and the shaft surface.

Figure 6:
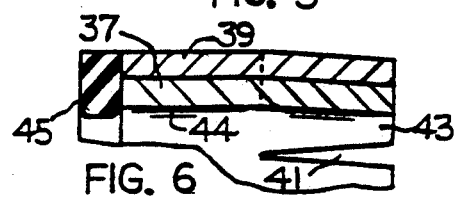

FIG. 6 shows a wear sleeve assembly wherein a heat-transmitting liner 37 has a radial wall thickness that is about the same as that of the metal steel sleeve 39. Both the sleeve and the liner have a number of triangular slots 41 extending therethrough. Each slot 41 extends from the right end edge of the sleeve-liner assembly to a point almost midway along the axial length of the wear unit.

In a typical construction the axial length of the wear unit is about one half inch and each slot 41 has a length of about three sixteenth inch. Although the number of slots can be varied, typically there may be about twelve slots 41 equidistantly spaced around the wear unit circumference. Elastomeric sealing unit 19 contacts the wear sleeve assembly on a circumferential line to the left of slots 41.

After the liner of FIG. 6 has been press fit into the sleeve, the sleeve-liner assembly is deformed radially in a die mechanism so that the right end portions of the assembly extend radially inwardly and rightwardly at acute angles to the wear unit central axis. The wall portions of the liner between slots 41 constitute deflectable tabs 43. When the wear unit is installed on a circular shaft the tabs will have pressure engagement with the shaft surface, such that the liner tabs can effectively transmit heat to the shaft.

The inner surface area 44 of liner 37 to the left of slots 41 is spaced away from the shaft surface. An annular elastomeric sealing element 45 is bonded to the left end edge of the sleeve-liner assembly to seal the space between the inner surface 44 of liner 37 and the shaft surface. The inner annular edge of elastomeric element 45 may be spaced radially inwardly from liner surface 44 about 0.1 inch to enable element 45 to have an effective sealing action on the shaft surface, with reasonably coarse tolerances on the shaft diameter.

Figure 7:
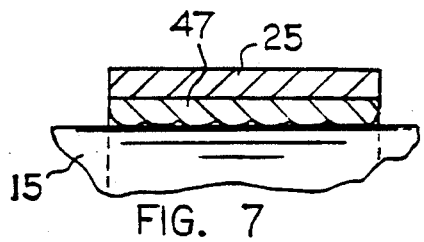

FIG. 7 illustrates a wear sleeve assembly wherein the liner 47 is formed of a relatively soft thermally conductive material, e.g. lead or zinc or a soldering alloy or similar material. The inner surface of the liner may have a number of axially-spaced circumferential grooves therein, so that when the wear unit is forced onto the circular shaft the relatively soft liner material can better deform in response to radial compressive forces between the sleeve 25 and shaft 15.

The liner material has an extensive contact area with the surface of shaft 15 for providing of a satisfactory liquid sealing action and a heat-transmitting connection from the wear sleeve assembly to the shaft. During installation of the wear sleeve assembly onto the shaft, steel or metal sleeve 25 remains rigid so that only the liner undergoes radial deformation. The liner forms a relatively dense thermally conductive packing between sleeve 25 and the shaft surface. In its as-formed state the liner has an inner diameter dimension less than the shaft diameter, e.g. about 0.01 inch difference.

Figure 8:
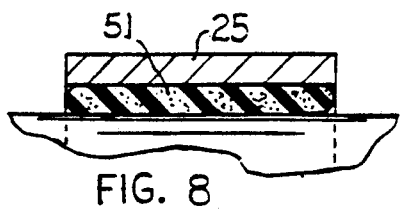

FIG. 8 shows a wear unit wherein the liner 51 is formed by an elastomeric cylinder bonded to the inner surface of steel sleeve 25. Prior to initial molding of liner 51, the elastomer is intimately mixed or blended with thermally conductive particles, e.g. chips or powders formed of copper, aluminum, graphite, etc. The conductive particles are substantially uniformly distributed throughout the elastomer so that when the elastomer-particle mixture is molded into an annular cylindrical configuration, the conductive particles will be in close enough contact to transmit heat from sleeve 25 to the shaft. The concentration of the conductive particles should be relatively high, such as about fifty percent of the liner mass on a weight basis or even more.

The liner will be molded so that its inner diameter is less than the diameter of the circular shaft. During installation of the wear sleeve assembly on the shaft the liner will be radially squeezed between the sleeve and shaft so as to serve as a liquid seal and as a thermal transmission device.

Figure 9:
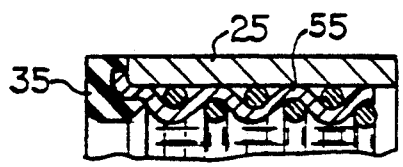

FIG. 9 shows a wear sleeve assembly wherein the liner 55 is formed of a woven metal mesh screen material. The screen wires may have diameters of about 0.025 inch. The inner diameter or the cylindrical screen is slightly less than the anticipated shaft diameter, such that when the wear unit is installed onto a circular shaft the wires will be subjected to a radial squeezing action by the sleeve and shaft surfaces.

The wires may experience some localized constriction or flattening as a response to the radially compressive mounting forces. However, the void spaces within the screen accommodate some of the displaced wires. The number of screen wires in direct contact with sleeve 25 and the shaft surface is relatively large. Therefore the screen can serve as a heat transmitting device between the sleeve 25 and the circular shaft 15. Also, the oil within the screen spaces will transmit some heat from the sleeve to the shaft. Liquid sealing action is accomplished by an annular elastomeric seal element 35 bonded to the left end edge of the sleeve-liner assembly.

Figure 10:
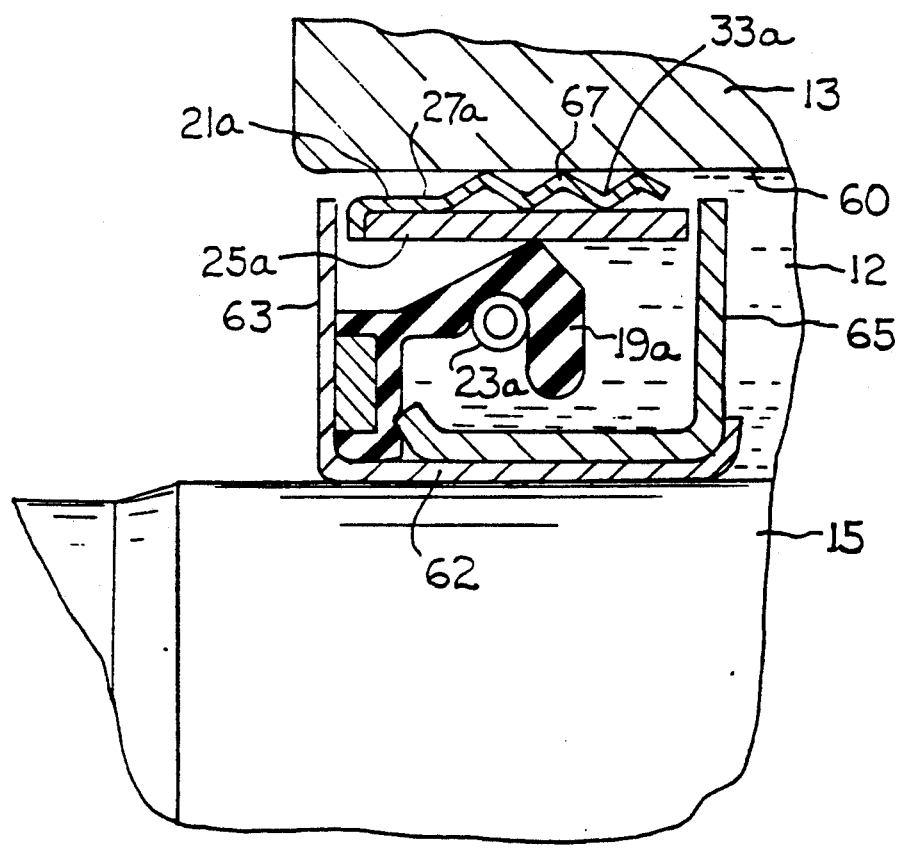
FIG. 10 is a view taken in the same direction as FIG. 1, but illustrating an arrangement wherein an elastomeric sealing element is carried on a circular shaft and an associated wear sleeve assembly is mounted on a housing surrounding the shaft.

FIG. 10 illustrates another construction of the present invention, wherein an elastomeric seal element 19a is carried on circular shaft 15, and a wear sleeve assembly 21a is mounted on a circular or cylindrical surface 60 of an annular housing 13. The arrangement of FIG. 10 is, in a sense, a reversal of parts of the structure depicted in FIG. 1.

As seen in FIG. 10, annular elastomeric seal element 19a is clamped or otherwise attached to an annular metal casing 62 that has a press fit on shaft 15. Casing 62 includes two axially-spaced radial walls 63 and 65 that trap the wear sleeve assembly 21a therebetween. A garter spring 23a is located within casing 62 to exert an outward radial force on elastomeric element 19a.

The construction of FIG. 10 is a so-called "unitized" seal assembly wherein the wear sleeve and elastomeric sealing element are installable together as a unit. The wear sleeve assembly includes a metallic heat-conducting sleeve 25a and a liner 27a formed of thermally conductive materials such as steel, copper or aluminum. The liner and sleeve are press fit together for disposition as a unit between casing walls 63 and 65.

Section 33a of liner 27a has localized areas 67 thereof projecting radially outwardly for pressure contact with housing surface 60. As shown on FIG. 10, projecting areas 67 are circumferential corrugations. However, the projecting areas could be axially-extending radial protrusions as shown in FIG. 4, or semi-spherical projections as shown in FIG. 5. Projecting areas 67 act to transmit seal friction heat from sleeve 25a into housing 13. The housing serves as a heat-dissipation device.

The dimensional relationships utilized in the FIG. 1 wear sleeve assembly will also be employed in the wear sleeve assembly of FIG. 10.

Liner 27a can be inserted onto or along housing surface 60 with a relatively low installation force, which is advantageous in many aftermarket situations where sophisticated seal installation equipment is not available.

The concepts behind the wear sleeve assemblies of FIGS. 6 through 9 can be utilized in the FIG. 10 environment. In each case the heat-transmitting deformable liner will be in pressure contact with housing surface 60, such that housing 13 will act as a heat dissipation device.

The drawings show various forms that the wear sleeve assembly of this invention can take. A common characteristic of the illustrated wear sleeve assembly is an ability to seal the gap between the sleeve 25 (or 25a) and the shaft or housing surface by easily deforming to meet differing gap dimensions associated with shaft-housing diameter tolerances. The various liners have the additional ability to serve as effective heat transmitters from the wear sleeve to the shaft surface or housing surface while presenting relatively low installation force requirements.

There has been disclosed heretofore the best embodiment of the invention presently contemplated. However, it is to be understood that various changes and modifications may be made thereto without departing from the spirit of the invention.

What is claimed is:

1. A wear sleeve assembly installable on a shaft for providing a seal contact surface, said wear sleeve assembly comprising:

an outer metallic wear sleeve formed of a wear-resistant material that is thermally conductive, said sleeve having a smooth outer surface and an inner surface which defines a radial gap around said shaft; and a radially resilient liner extending within said sleeve, said liner having an outer surface press-fit against the inner surface of said sleeve and an inner surface having a radially inwardly extending portion adapted to have pressure engagement against said shaft; said liner being formed of a thermally conductive deformable sheet metal material; said liner having an unstressed radial extent that is slightly greater than the radial gap between the wear sleeve and the shaft, so that when the wear sleeve assembly is installed on the shaft, the liner will be radially squeezed between the sleeve and the shaft so as to be in a radially stressed resilient condition; said liner defining a first void space between said inner surface of said wear sleeve and said outer surface of said liner at a position adjacent to and radially outward of said radially inwardly extending portion of said liner, and said liner defining a second void space between said liner surface of said liner and said shaft at a position axially spaced from said first void space.

2. The wear sleeve of claim 1, wherein the liner includes a first section having a press fit in the wear sleeve and a second section axially spaced from said first section and having localized areas projecting radially inwardly for pressure contact with a shaft surface.

3. The wear sleeve assembly of claim 2, wherein said localized areas of the liner are configured as circumferential corrugations.

4. The wear sleeve assembly of claim 2, wherein said sheet metal material comprises a wall thickness substantially less than the radial gap between the wear sleeve and the shaft surface.

* * * * *

UNITED STATES PATENT AND TRADEMARK OFFICE
CERTIFICATE OF CORRECTION

PATENT NO. : 5,082,294

DATED : January 21, 1992

INVENTOR(S) : David M. Toth and William H. Riggs

It is certified that error appears in the above-identified patent and that said Letters Patent is hereby corrected as shown below:

Column 8, line 39, claim 1, "liner surface" should read
-- inner surface --

Signed and Sealed this

Twenty-seventh Day of April, 1993

Attest:

MICHAEL K. KIRK

*Attesting Officer*    Acting Commissioner of Patents and Trademarks